US006767472B2

(12) United States Patent
Miller

(10) Patent No.: US 6,767,472 B2
(45) Date of Patent: Jul. 27, 2004

(54) CATALYTIC FIXED BED REACTOR SYSTEMS FOR THE DESTRUCTION OF CONTAMINANTS IN WATER BY HYDROGEN PEROXIDE AND OZONE

(75) Inventor: Christopher M. Miller, Wadsworth, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 10/230,909

(22) Filed: Aug. 30, 2002

(65) Prior Publication Data

US 2003/0075513 A1 Apr. 24, 2003

Related U.S. Application Data

(63) Continuation-in-part of application No. 09/776,299, filed on Feb. 2, 2001, now abandoned, which is a continuation-in-part of application No. 09/103,927, filed on Jun. 24, 1998, now abandoned.

(51) Int. Cl.[7] .............................. C02F 1/00; C02F 1/72; C02F 1/78
(52) U.S. Cl. ...................... 210/743; 210/759; 210/763; 210/760
(58) Field of Search ................................ 210/759, 763, 210/760, 743

(56) References Cited

U.S. PATENT DOCUMENTS

| | | | |
|---|---|---|---|
| 3,944,487 A | 3/1976 | Davis et al. .................. 210/62 |
| 3,965,249 A | 6/1976 | Kinosz ........................ 423/497 |
| 4,007,118 A | 2/1977 | Ciambrone ............... 210/63 Z |
| 4,029,578 A | 6/1977 | Turk ......................... 210/63 Z |
| 4,073,873 A | 2/1978 | Caldwell et al. ............ 423/499 |
| 4,297,333 A | 10/1981 | Crawford et al. ........... 423/241 |
| 4,321,143 A | 3/1982 | Wilms et al. ............... 210/631 |

(List continued on next page.)

FOREIGN PATENT DOCUMENTS

| | | | | |
|---|---|---|---|---|
| DE | 4137864 | | 5/1993 | |
| JP | 205194 | | 8/1988 | .................. 210/759 |
| JP | 03285672 A | * | 12/1991 | ............ C12M/1/40 |
| JP | 05228481 A | * | 9/1993 | ............. C02F/1/78 |

OTHER PUBLICATIONS

"Formation of Superoxide Ion During the Decomposition of Hydrogen Peroxide on Supported Metals" by Ono et al., *Journal of Physical Chemistry*, vol. 81, No. 13, pp. 1307–1311, 1977.

"Formation of Superoxide Ion During the Decomposition of Hydrogen Peroxide on Supported Metal Oxides" by Kitajima et al., *The Journal of Physical Chemistry*, vol. 82, pp. 1505–1509, 1978.

"Studies on MnO2–III. The Kinetics and the Mechanism for the Catalytic Decomposition of $H_2O_2$ Over Different Crystalline Modifications of $MnO^{2-}$" by Kanungo et al., *Electrochimica Acta*, vol. 26, pp. 1157–1167, 1981.

"Hydrogen Peroxide Decomposition and Quinoline Degradation in the Presence of Aquifer Material" by Miller and Valentine, *Water Research*, vol. 29, No. 10, 2353–2359, 1995.

(List continued on next page.)

*Primary Examiner*—Chester T Barry
(74) *Attorney, Agent, or Firm*—Roetzel & Andress; Donald J. Firca; George W. Moxon, II

(57) ABSTRACT

A process for the treatment of an aqueous media having contaminants therein, including adding hydrogen peroxide to the aqueous media, exposing the aqueous media to a catalytic environment, removing the aqueous media from the catalytic environment prior to the aqueous media having a five minute residence time within the catalytic environment, thereafter adding ozone to the aqueous media, and allowing the ozone and aqueous media to interact outside of the presence of the catalytic environment.

20 Claims, 3 Drawing Sheets

U.S. PATENT DOCUMENTS

| | | | | |
|---|---|---|---|---|
| 4,361,486 A | | 11/1982 | Hou et al. | 210/722 |
| 4,400,304 A | | 8/1983 | Clark et al. | 252/430 |
| 4,732,688 A | | 3/1988 | Bryan et al. | 210/753 |
| 4,743,381 A | | 5/1988 | Bull | 210/759 |
| 4,970,005 A | | 11/1990 | Schuchardt | 210/759 |
| 5,120,453 A | | 6/1992 | Frame | 210/759 |
| 5,192,452 A | | 3/1993 | Mitsui | 210/760 |
| 5,302,356 A | | 4/1994 | Shadman | 210/760 |
| 5,348,665 A | | 9/1994 | Schulte et al. | 210/759 |
| 5,352,369 A | | 10/1994 | Heinig, Jr. | 210/760 |
| 5,364,537 A | * | 11/1994 | Paillard | 210/743 |
| 5,376,284 A | | 12/1994 | Takemura et al. | 210/759 |
| 5,492,633 A | | 2/1996 | Moniwa | 210/760 |
| 5,501,801 A | | 3/1996 | Zhang et al. | 210/748 |
| 5,505,856 A | | 4/1996 | Campen | 210/760 |
| 5,755,977 A | | 5/1998 | Gurol et al. | 210/759 |
| 5,817,240 A | | 10/1998 | Miller et al. | 210/759 |
| 5,849,201 A | | 12/1998 | Bradley | 210/752 |
| 6,129,849 A | | 10/2000 | Yoshikawa et al. | 210/760 |
| 6,299,761 B1 | | 10/2001 | Wang et al. | 210/87 |
| 2001/0017929 A1 | | 8/2001 | Maynard | |
| 2001/0035116 A1 | | 11/2001 | Schivelev | |
| 2002/0017796 A1 | | 2/2002 | Maynard | |

OTHER PUBLICATIONS

"Oxidation Behavior of Aqueous Contaminants in the presence of Hydrogen Peroxide and Filter Media" by Miller and Valentine, *Journal of Hazardous Materials*, vol. 41, 105–116, 1995.

Pending U.S. application Ser. No. 08/745,240 entitled "Catalytic Fixed Bed Reactor Systems for the Destruction of Contaminants in Water by Hydrogen Peroxide" by Miller and Valentine, filed Nov. 12, 1996.

*CRC Handbook of Chemistry and Physics*, $59^{th}$ Ed. (1979), p. B–92 (density of aluminum oxides) 1978.

"Hydrogen Peroxide Decomposition and Contaminant Degradation in the Presence of Sandy Aquifer Material," by Christopher M. Miller, Ph.D. thesis, Civil and Envir. Eng. Dept., Graduate College of The University of Iowa, Iowa City, IA, approved Aug. 1995.

"Hydrogen Peroxide Decomposition and Contaminant Degradation in the Presence of Sandy Aquifer Material," by Christopher M. Miller, Ph.D. thesis, Library catalog record, The University of Iowa Libraries, Monographic Acquisition Department, record printed Sep. 7, 2000.

* cited by examiner

CATALYTIC FIXED BED REACTOR SYSTEMS FOR THE DESTRUCTION OF CONTAMINANTS IN WATER BY HYDROGEN PEROXIDE AND OZONE

This application is a continuation-in-part of U.S. patent application Ser. No. 09/776,299, filed Feb. 2, 2001, now abandoned, which is a continuation-in-part of U.S. patent application Ser. No. 09/103,927, filed Jun. 24, 1998, also now abandoned.

BACKGROUND OF THE INVENTION

The present invention relates to an improved process for the oxidative treatment of contaminated aqueous media. Specifically, the present invention relates to a process whereby hydrogen peroxide and ozone are employed to treat contaminated aqueous media with unexpectedly high contaminant removal. The hydrogen peroxide is exposed to a catalytic environment for a controlled period of time, and ozone is added to the aqueous media subsequent to the removal of the aqueous media from the catalytic environment.

Oxidation processes are one important class of treatment technology that destroy contaminants in aqueous media and yield harmless products. For purposes of this disclosure, the terms destruction and degradation of contaminants will refer to the transformation of such contaminants, including any form of transformation such as polymerization, bond-breaking or even complete oxidation to carbon dioxide. One such oxidation process generally involves reactions of organics with reactive species such as hydroxyl radicals, superoxides, hydrated electrons and singlet oxygen. Ozone with ultra-violet light and ozone with hydrogen peroxide have been successfully used for the treatment of synthetic organics and chemicals resistant to biological degradation. These processes, however, suffer from being more expensive than traditional water treatment processes, and are subject to radical traps that can severely reduce their efficiency.

Hydrogen peroxide has been used as an oxidant in engineered systems for treatment of liquid wastes and as a source of oxygen for enhanced bioremediation in aquifers and soil systems. The use of hydrogen peroxide is based on the exploitation of its decomposition chemistry, which can involve the formation of reactive intermediates such as hydroxyl radicals (OH.), perhydroxyl radicals (.$HO_2$), and superoxide radical anions ($O_2^-$). For example, the reaction of hydrogen peroxide with ferrous iron, commonly referred to as Fenton's reagent, has been shown to produce hydroxyl radicals. Hydroxyl radicals are one of the most powerful oxidizing species known, capable of reacting with a wide range and number of organic compounds.

Heretofore in the art it has generally had been believed that the contaminant degradation efficiency of a hydrogen peroxide system could be increased by increasing the amount and rate of hydrogen peroxide decomposition, which was believed to lead to a proportional increase in usable reactive intermediates, i.e., those intermediates that react with the contaminant or lead to the degradation of the contaminant. It was also believed that increased efficiency could be achieved by increasing the concentration of hydrogen peroxide within the system, as well as by increasing the exposure time between the hydrogen peroxide and catalyst. In other words, it was believed that the mass of hydrogen peroxide decomposed increased as the hydrogen peroxide was in contact with the catalyst, thereby leading to increased concentrations of intermediates that would react and degrade contaminants. It has recently been discovered, however, that the formation of useful intermediates from hydrogen peroxide decomposition is not proportional to the amount of hydrogen peroxide decomposed and/or the exposure time between hydrogen peroxide and the catalyst. That is, as hydrogen peroxide is decomposed by catalysis, the concentration of useful reactive intermediates does not increase with increasing concentrations of hydrogen peroxide added to the system. In fact, useful intermediate concentration is believed to decrease.

It is generally believed that the decrease in useful intermediate concentration is a result of scavenging by the catalytic material. Heretofore in the art, attempts to prevent this scavenging included covering up surface sites or adding amendments to the catalyst to control the reactive pathways. A more detailed explanation of these mechanisms is set forth hereinbelow.

Thus, a need exists to develop a hydrogen peroxide system for treatment of contaminants in aqueous media that reduces the inefficiencies associated with hydrogen peroxide systems known in the art.

SUMMARY OF INVENTION

It is therefore, an object of the present invention to provide a a process for the treatment of contaminated aqueous mediums.

It is another object of the present invention to provide a process whereby contaminant decomposition is accelerated.

It is yet another object of the present invention to provide a process whereby hydrogen peroxide is employed in conjunction with a catalytic material in a fashion where scavenging by the catalytic material is reduced.

At least one or more of the foregoing objects, together with the advantages thereof over the known art relating to the oxidative treatment of contaminated solutions, which shall become apparent from the specification that follows, are accomplished by the invention as hereinafter described and claimed.

In general the present invention provides a process for the treatment of an aqueous media having contaminants therein, comprising adding hydrogen peroxide to the aqueous media, exposing the aqueous media to a catalytic environment, removing the aqueous media from the catalytic environment prior to the aqueous media having a five minute residence time within the catalytic environment, adding ozone to the aqueous media, and allowing the ozone and aqueous media to interact for at least one minute outside of the presence of the catalytic environment.

The present invention also provides a process for the treatment of an aqueous media having contaminants therein comprising the steps of adding hydrogen peroxide to the aqueous media, exposing the aqueous media to a catalytic environment, removing the aqueous media form the catalytic environment before five percent of the hydrogen peroxide decomposes, adding ozone to the aqueous media, and allowing the ozone and aqueous media to interact for at least one minute outside of the presence of the catalytic environment.

The present invention further provides an improved process for degrading organic contaminants within an aqueous media of the type where hydrogen peroxide is added to the aqueous media, and the aqueous media containing the hydrogen peroxide is introduced to a catalytic environment to initiate decomposition of the hydrogen peroxide, wherein the improvement comprises controlling the exposure of the hydrogen peroxide to the catalytic environment so that the aqueous media is removed from the catalytic environment before five percent of the hydrogen peroxide entering the catalytic environment is decomposed by the catalytic environment, and the improvement further comprises adding ozone to the aqueous media immediately after the aqueous media ceases contact with the catalytic environment.

PREFERRED EMBODIMENT FOR CARRYING OUT THE INVENTION

Figure 1:
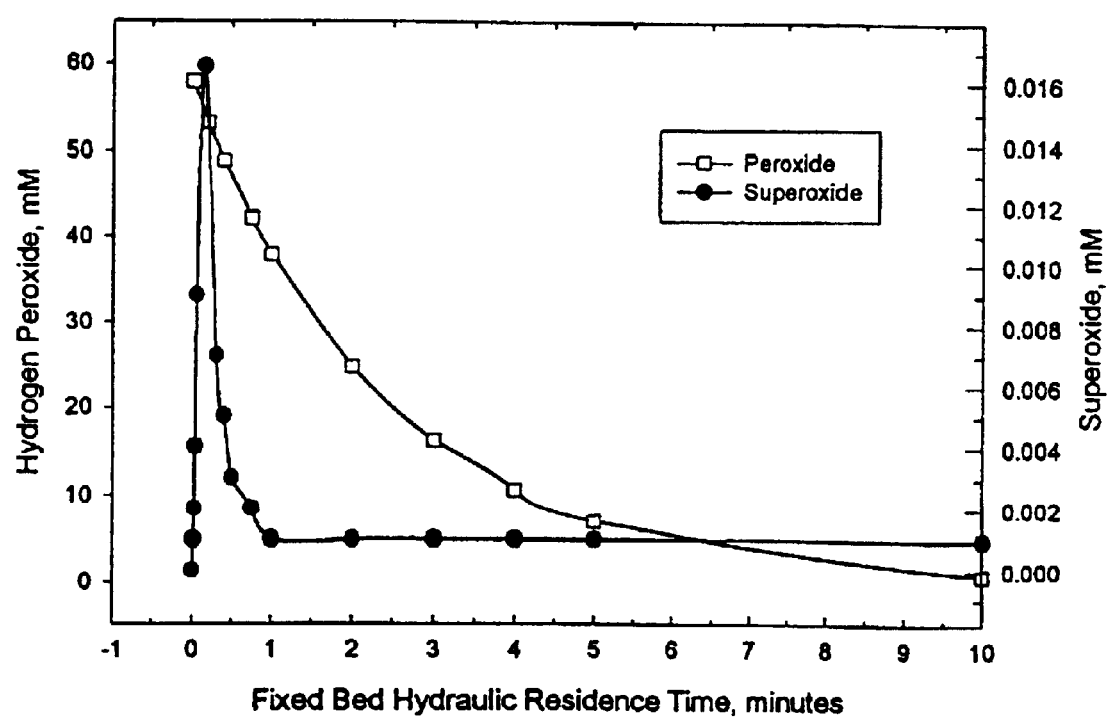
FIG. 1 is a graph of peroxide and superoxide concentration in an aqueous stream leaving the fixed bed reactor versus fixed bed hydraulic residence time.

The present invention relates to an improved process for the oxidative treatment of contaminated aqueous media. Specifically, it has been found that hydrogen peroxide and ozone can be employed to treat contaminated aqueous media with unexpectedly high contaminant removal when the hydrogen peroxide is exposed to a catalytic environment for a controlled period of time.

The present invention is best explained once the step of controlling the exposure time of the hydrogen peroxide to the catalytic environment is understood. Therefore, this step will first be discussed. In general, hydrogen peroxide is added to the aqueous media, the aqueous media is exposed to a catalytic environment, and then the aqueous media is removed from the catalytic environment. The time in which the aqueous media containing hydrogen peroxide is in contact with the catalytic environment will be referred to as the residence time or exposure time.

For purposes of this disclosure, the processes or apparatus of the present invention will be discussed with reference to an aqueous media containing contaminants. The term aqueous media will generally refer to an aqueous media having contaminants dissolved therein, but this term should not be viewed as limiting the disclosure of the present invention inasmuch as solid particles suspended within the media can also be included. Further, the term contaminants will include organic contaminants such as phenol, quinoline and nitrobenzene, which are dissolved within the aqueous media. The contaminants disclosed herein, however, should also not be viewed as limiting the scope of the invention inasmuch any contaminant that is subject to degradation or destruction by oxidation, e.g., reaction with hydroxyl radical, can be treated by the processes of the present invention.

Furthermore, for purposes of this disclosure, reference will be made to useful reactive intermediates. Reactive intermediates refer to those radicals that react with and oxidize contaminants, or those radicals or intermediate compounds that react with hydrogen peroxide or ozone to form radicals that react with and oxidize contaminants. Moreover, useful reactive intermediates refer to those radicals available for oxidation of a contaminant. That is, those reactive intermediates that are not scavenged by the catalyst.

Specifically, the process of the present invention involves adding hydrogen peroxide to a contaminated aqueous stream and passing the stream through a catalyst. The catalyst is preferably a catalytically active granular media. The decomposition of hydrogen peroxide, which leads to reactive intermediate formation, is catalyzed by metal oxides contained on the granular media. A variety of natural or synthetic materials may be utilized such as conventional filter sand, which typically is coated with active iron oxides, or a granular material to which iron or other active metal oxides have been deposited. Other materials include prepared iron coated sand, conventional filter sand and naturally obtained river sand, e.g that obtained from the Iowa river, or acid rinsed sand.

The amount of hydrogen peroxide added to the system is typically a function of the mass of contaminants to be degraded. Generally, about 3 to about 50 milligrams of hydrogen peroxide is used per milligram of contaminant. It is more desirable to use smaller quantities of hydrogen peroxide per quantity of contaminant for cost considerations. Accordingly, a more efficient system will be able to employ less than about 20 milligrams, preferably less than about 10 milligrams, and more preferably less than about 5 milligrams of hydrogen peroxide per milligram of contaminant. It should be understood that the amount of hydrogen peroxide necessary is dependent on the catalytic material employed as well as other conditions such as temperature and pH, and even the nature of the contaminants. Although any amount of hydrogen peroxide could be added, it must be appreciated that hydrogen peroxide itself may scavenge useful reactive intermediaries and therefore deleteriously impact the system at high concentrations.

The process of the present invention further entails removing the aqueous stream from the catalyst reactor when the concentration of reactive intermediates resulting from hydrogen peroxide decomposition is at or near its greatest concentration while in the presence of the catalyst. Preferably, the time at which the stream is removed from the presence of the catalyst is prior to complete scavenging of the reactive intermediates, or prior to a time that scavenging reduces the concentration of reactive intermediates to an undesired level. That is, the aqueous stream is contacted with the catalyst for a time sufficient to form perhydroxyl and superoxide radicals and yet minimize the subsequent reaction of the perhydroxyl and superoxide radicals with the catalyst.

Because each catalyst material that may be employed in the processes or apparatus of the present invention can have a different reactivity toward hydrogen peroxide, the exposure time desired according this invention cannot be stated in general terms. That is, the time that the aqueous stream should be in contact with the catalyst is a function of the catalyst employed. Bottom line, the exposure time should be long enough to maximize the concentration of usable reactive intermediates and short enough to prevent the scavenging of the reactive intermediates that are formed.

To best understand the time at which the aqueous stream should be removed from the catalytic reactor, reference is made to FIG. 1. As can be seen, it is believed that for most catalytic materials, the exposure time necessary to reach the maximum reactive intermediate concentration is very short, and lasts for only a very short period of time because it is believed that scavenging of these radicals occurs rapidly. Thus, for most catalytic materials, the aqueous stream should only contact the catalyst for a short time before being removed from the catalytic environment. With reference again to FIG. 1, maximization of superoxide and/or perhydroxyl radical concentration is achieved with a catalyst exposure time that corresponds to that area of the plot where superoxide and perhydroxyl radical concentration is the greatest. It should be understood that FIG. 1 is a hypothetical representation of useful reactive intermediate concentration or that concentration capable of leaving the catalytic environment without being scavenged. Ideally, a residence time that produces a maximum amount of useful intermediates is most preferred, although the skilled artisan will appreciate that engineered systems are not that precise and therefore the invention contemplates controlling the residence time within a reasonable range around the maximum peak.

For example, in one embodiment of the present invention, where conventional filter sand is employed as the catalytic material, the time that the aqueous stream should be in contact with the catalyst is generally less than about 5 minutes, preferably less than about 1 minute, more preferably less than about 0.5 minutes, and more preferably in the range from about from about 0.05 to about 0.25 minute.

The exposure time to the catalyst, t, may also be defined in terms of the hydrogen peroxide decomposition desired for any given exposure period. This can be determined using the formula $-\ln(C/C_o)/k_{obs}=t$; where C is the hydrogen peroxide concentration of the effluent leaving the catalytic environment, $C_o$ is the hydrogen peroxide concentration entering the catalytic environment and $k_{obs}$ is a first order rate constant characterizing the hydrogen peroxide decomposition rate in the fixed bed at given reaction conditions. One of ordinary skill in the art, without undue experimentation, can readily determine $k_{obs}$ for any given catalyst.

Accordingly, it is an aspect of a preferred embodiment of the present invention to obtain less than about 5% hydrogen peroxide decomposition per period or per pass through the catalytic environment. Preferably, hydrogen peroxide decomposition is less than about 3% and more preferably less than about 1% per pass.

After being exposed to the catalytic material within the catalytic reactor for the desired period of time, the aqueous stream is removed from the catalytic reactor and introduced to an external reactor. Preferably, the external reactor is devoid of any catalyst, although minimal catalyst carry-over from the catalytic reactor to the external reactor should not deleteriously impact an engineered system. Within this external reactor, and outside of the presence of catalytic material, it is believed that the superoxide and perhydroxyl radicals formed within the catalytic reactor react with hydrogen peroxide or ozone to form the desired hydroxyl radical. As discussed above, it is believed that the reaction taking place within the external reactor is successful because the competing catalytic sites are not present to scavenge the radicals.

Without wishing to be bound by any particular theory, the unexpected success achieved by controlling the residence time is believed to result from reduced scavenging of useful reactive intermediates by the catalytic environment. As it is understood, the decomposition of hydrogen peroxide is catalyzed by metals, such as iron, copper, and manganese within the catalyst. The decomposition of hydrogen peroxide forms free radicals, also referred to as reactive intermediates. These reactive intermediates are believed to include, potentially among others, hydroxyl radicals (OH.), perhydroxyl radicals ($.HO_2$), and superoxide anions ($O_2^-$). A free radical or reactive intermediate is generally defined as a species that contains one or more unpaired electrons. Due to its unpaired electron, most free radicals are very reactive and have extremely short lifetimes. Studies show that the hydroxyl radical (OH.) is one of the most reactive species for the degradation of contaminants.

The chemistry involved in the reaction of hydrogen peroxide with metal oxide should serve to facilitate an understanding of the present invention, but should not serve to limit the present invention; rather, the claims will define the scope of the invention.

Where S and $S^+$ represent reduced and oxidized catalyst sites, respectively, it is believed that the following reactions occur.

$$S+H_2O_2 \rightarrow S^+ + OH^- + .OH \quad (I)$$

$$S^+ + H_2O_2 \rightarrow S + .HO_2 + H^+ \quad (II)$$

Because of its formation near the catalyst surface and its extreme reactivity, especially toward the catalyst, the hydroxyl radical (.OH), formed per reaction (I), is likely scavenged by the catalyst according to the following.

$$S^{n+} + .OH \rightarrow S^{(n+1)+} + OH^- \quad (III)$$

By scavenged it is meant that the reactive intermediate is reacted with a reagent other than the desired contaminant molecule, i.e. the reactive intermediate is not usable. In equation (III), the other reagent is the catalyst.

It should be appreciated that the perhydroxyl radical ($.HO_2$), formed in reaction (II) is also reactive with the catalyst, but because it is less reactive than the hydroxyl radical, a greater concentration of perhydroxyl radical ($.HO_2$) escapes scavenging. In fact, the perhydroxyl radical reaction rate constant is several orders of magnitude less reactive with the catalyst than the hydroxyl radical.

Thus, it is believed that usable amounts of perhydroxyl radical ($.HO_2$) are present following hydrogen peroxide decomposition. It is further believed that the perhydroxyl radical exists in equilibrium with a proton and a superoxide molecule ($O_2^-$) according to the following equilibrium reaction.

$$.HO_2 \rightleftharpoons H^+ + O_2^- \quad (IV)$$

Both the perhydroxyl radical ($.HO_2$) and the superoxide ($O_2^-$) are of interest because they react with hydrogen peroxide to form hydroxyl radicals (.OH), which are believed to be the most desirable intermediate for the degradation of contaminants. The reactions of these intermediate products with hydrogen peroxide are as follows.

$$.HO_2 + H_2O_2 \rightarrow .OH + H_2O + O_2 \quad (V)$$

$$O_2^- + H_2O_2 \rightarrow .OH + OH^- + O_2 \quad (VI)$$

It should be appreciated that the reaction of the perhydroxyl radical with hydrogen peroxide, as demonstrated in Formula (V) is in fact kinetically faster than the reaction of superoxide with hydrogen peroxide as demonstrated in Formula (VI). Thus, it should be understood that the pH of the system will affect hydroxyl radical formation and scavenging by the catalyst. In other words, it has been found that acidic conditions will improve the efficiency of useful intermediates per hydrogen peroxide decomposed.

Accordingly, the ability of superoxide and perhydroxyl radicals to further react with hydrogen peroxide and form hydroxyl radicals is believed to be critical. These reactions, however, are slow when compared with the reaction of perhydroxyl radical or superoxide with the catalyst. In fact, reaction (V) and (VI) are believed to be several orders of magnitude slower than the following reactions with the catalyst, i.e. S and $S^+$.

$$S^+ + O_2^- \rightarrow S + O_2 \quad (VII)$$

$$S + .HO_2 \rightarrow S^+ + HO_2^- \quad (VIII)$$

Therefore, it is understood that the reaction of perhydroxyl radicals and superoxides with the metal catalyst sites is faster, and thus more competitive, than that of the perhydroxyl radical and superoxide with the hydrogen peroxide. The fact that the reaction of the perhydroxyl radical and superoxide with the metal site is faster and more competitive, from a chemical kinetics standpoint, inhibits the production of the desired hydroxyl radical. In other words, a significant amount of perhydroxyl and superoxide radicals are scavenged prior to their reaction with hydrogen peroxide. The ability of the hydrogen peroxide, therefore, to oxidize and ultimately degrade contaminants is severely limited.

This analysis explains the results observed heretofore in the art wherein contaminant degradation is severely limited in the presence of a catalyst. With reference to FIG. 1, there is depicted a general representation of superoxide concentration in the presence of a catalyst over time. Also depicted is hydrogen peroxide concentration over time. As stated above, it is believed that the reduction in superoxide concentration results from scavenging of the superoxide by the catalyst at large contact or residence times. It should be further understood that because superoxide concentration decreases rapidly after long periods of contact with the catalyst, the ability of the system to degrade contaminants is also reduced at this point.

In sum, it is believed that over-exposure or prolonged catalysis of hydrogen peroxide to a catalyst will not produce significant concentrations of intermediates useful for the oxidation of contaminants. The useful reactive intermediates, or their predecessor intermediates, are scavenged prior to reacting with the contaminant.

Now that the step of controlling the hydrogen peroxide residence time within the catalytic environment is understood, it should be appreciated that the improvement achieved by the process of the present invention lies in the addition of ozone to the aqueous media.

The ozone can be added to the aqueous media as an aqueous solution of ozone, or can be added in the gaseous phase. The skilled artisan will recognize various efficient ways for forming an aqueous solution of ozone. For example, and according to the preferred method of the present invention, an aqueous solution of ozone is formed by way of an ozone generator and mass transfer chamber.

With respect to the amount of ozone that is useful, it should be appreciated that the upper limit of the amount of ozone that can be added is a function of the amount of ozone that is soluble in water. Accordingly, the maximum amount of ozone that can be added by way of an aqueous solution of ozone is generally about 7 mg/liter, depending on pH and temperature. Preferably, the pH is in a range of from about 4 to about 10, and more preferably in a range of from about 6 to about 9. The skilled artisan will recognize, however, that the ozone concentration within an aqueous media can be increased if desired. For example, known techniques include manipulating the size of the ozone gas bubble and thereby allow a greater concentration of ozone to be dissolved in water. Typically, the amount of ozone employed is a function of the amount of hydrogen peroxide employed. Generally, the ratio of hydrogen peroxide to ozone is in the range from about 0.2 to about 0.5 milligrams of hydrogen peroxide to 1 milligram of ozone, preferably from about 0.3 to about 0.4 milligrams of hydrogen peroxide to 1 milligram of ozone, and even more preferably about 0.35 milligrams of hydrogen peroxide to 1 milligram of ozone.

In a preferred embodiment, the ozone is added to the aqueous media immediately, after the aqueous media is removed from the catalytic environment. By immediately it is meant that the ozone should be added to the aqueous media within 2.5 minutes of the aqueous media leaving the catalytic environment. Preferably, the ozone should be added in less than one minute, more preferably in less than 0.5 minutes, and even more preferably in less than 0.3 minutes from the time that the aqueous media is removed from the catalytic environment.

Without wishing to be bound by any particular theory, the unexpected results achieved by adding ozone ($O_3$) to the aqueous media after leaving the catalyst bed is believed to result from the reaction of ozone with certain reactive intermediates in the aqueous media to form other reactive species that in turn are highly effective in decomposing organic contaminants. A review of the chemistry involved in the reaction of ozone with reactive intermediates should serve to facilitate disclosure of the present invention, but should not serve to limit the present invention; rather, the claims will define the scope of the invention.

Ozone ($O_3$) reacts with superoxide ($O_2^-$) to form $O_3^-$ via the reaction defined by formula (IX):

$$O_3 + O_2^- \rightarrow O_3^- + O_2 \qquad (IX)$$

$O_3^-$ further reacts with water (H2O) to form the hydroxyl radical (.OH) as defined by formula (X):

$$O_3^- + H_2O \rightarrow .OH + O_2 + OH^- \qquad (X)$$

The reaction pathway to (.OH) defined by formulas (IX) and (X) is a approximately 20 times faster than that defined by formula (V)

$$.OH_2 + H_2O_2 \rightarrow .OH + H_2O + O_2 \qquad (V)$$

Thus the addition of ozone to the aqueous media leaving the catalyst bed provides for more rapid formation of the desirable hydroxyl radical intermediate (.OH) than is achievable with hydrogen peroxide alone. A more rapid degradation of organic contaminants is in turn achieved. In other words, for a given process time, more organic contaminant is degraded in the process with the addition of ozone to the aqueous media after leaving the catalyst bed than without the addition of ozone to the aqueous media.

Again, the ozone is preferably added to the aqueous media within 2.5 minutes of the aqueous media leaving the catalytic environment. Additionally, once the ozone is added, the ozone and aqueous media are allowed to interact outside of the presence of the catalytic environment for at least about one minute. In another embodiment of the present invention, the ozone and aqueous media are allowed to interact outside of the presence of the catalytic environment for at least about 5 minutes, and, yet another embodiment, for at least about 15 minutes.

Ozone is unstable in aqueous media. Therefore, it will be readily appreciated by those of ordinary skill in the art that the majority of ozone will have decomposed and disappeared after roughly about 30 minutes of contact with the aqueous media. Thus, a non-limiting upper boundary for the time during which the ozone and aqueous media should be allowed to interact outside of the presence of the catalytic environment is 30 minutes. Indeed, in the general experiments provided hereinbelow, the ozone and aqueous media were allowed to interact outside of the presence of the catalytic environment and within a continuous stirred tank reactor for a residence time of 20 minutes. Generally, the longer the interaction time, the better the results, understanding, as mentioned above, that substantially all of the ozone will have decomposed within the aqueous media after about 30 minutes.

Realizing that hydrogen peroxide may still be present in the aqueous media after the at least about one minute of interaction between the aqueous media and the ozone outside of the catalytic environment, it should be appreciated that the aqueous media could be reintroduced to the catalytic environment in order to take advantage of the remaining hydrogen peroxide and its interaction with the catalyst.

Figure 2:
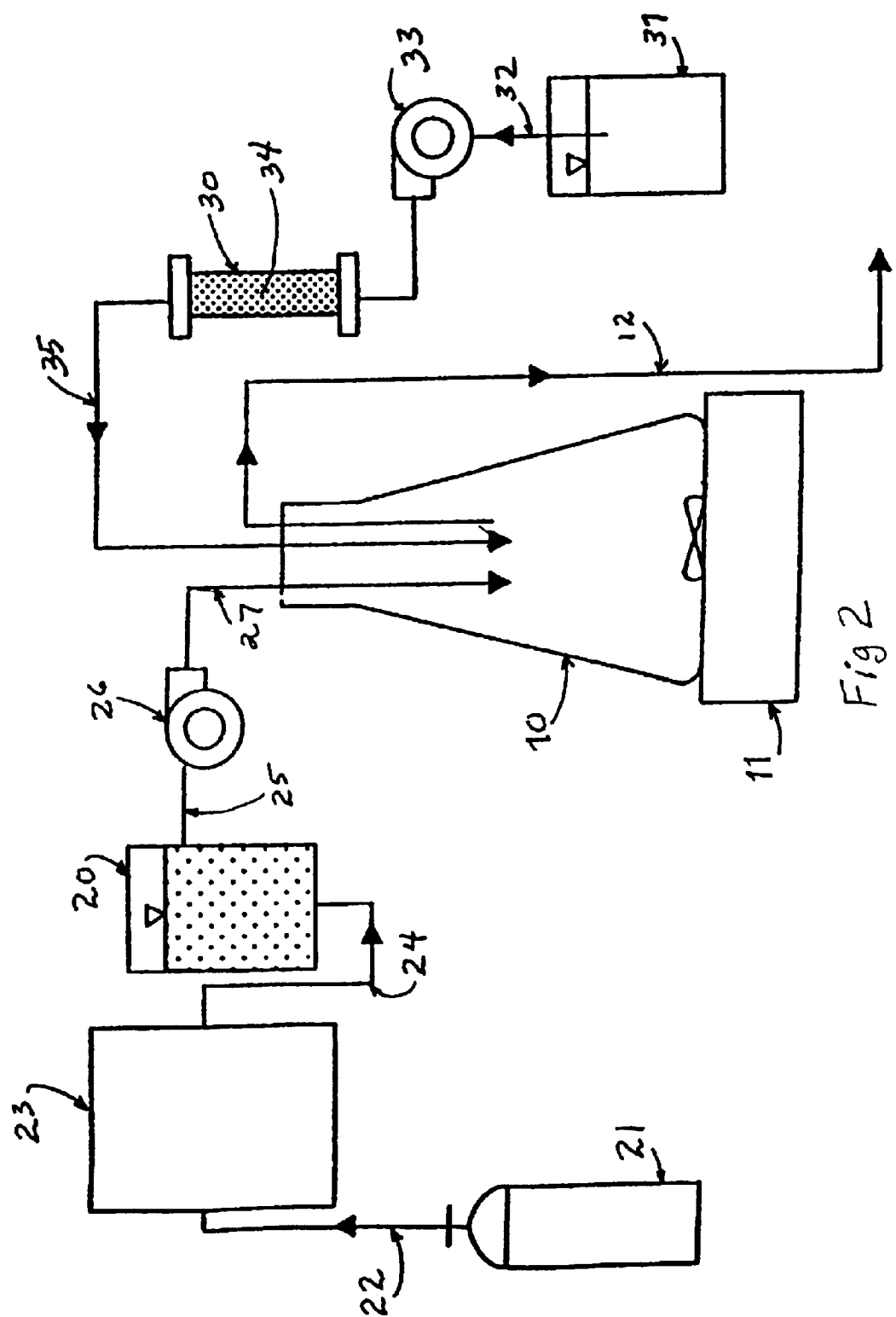
FIG. 2 is a depiction of the experimental apparatus used in one embodiment of the present invention.

In practicing a preferred process of the present invention, reference is made to FIG. 2. As can be seen in FIG. 2, a preferred embodiment the process employs a continuous stirred tank reactor (CSTR) 10 wherein the bulk of the organic contaminant degradation occurs. Gaseous oxygen 22 supplied by oxygen source 21 is converted to gaseous ozone 24 in ozone generator 23. The gaseous ozone 24 contacts water in mass transfer chamber 20 to create an aqueous solution of ozone in water 25 that is fed via pump 26 to CSTR 10. An aqueous solution of hydrogen peroxide and organic contaminant 32 supplied by reservoir 31 is fed via pump 33 to fixed bed reactor 30 that contains bed of sand 34. The resulting aqueous solution 34 is fed to CSTR 10. CSTR 10 is continuously stirred with stirrer 11 and outlet stream 12 is withdrawn continuously for sampling.

Figure 3:
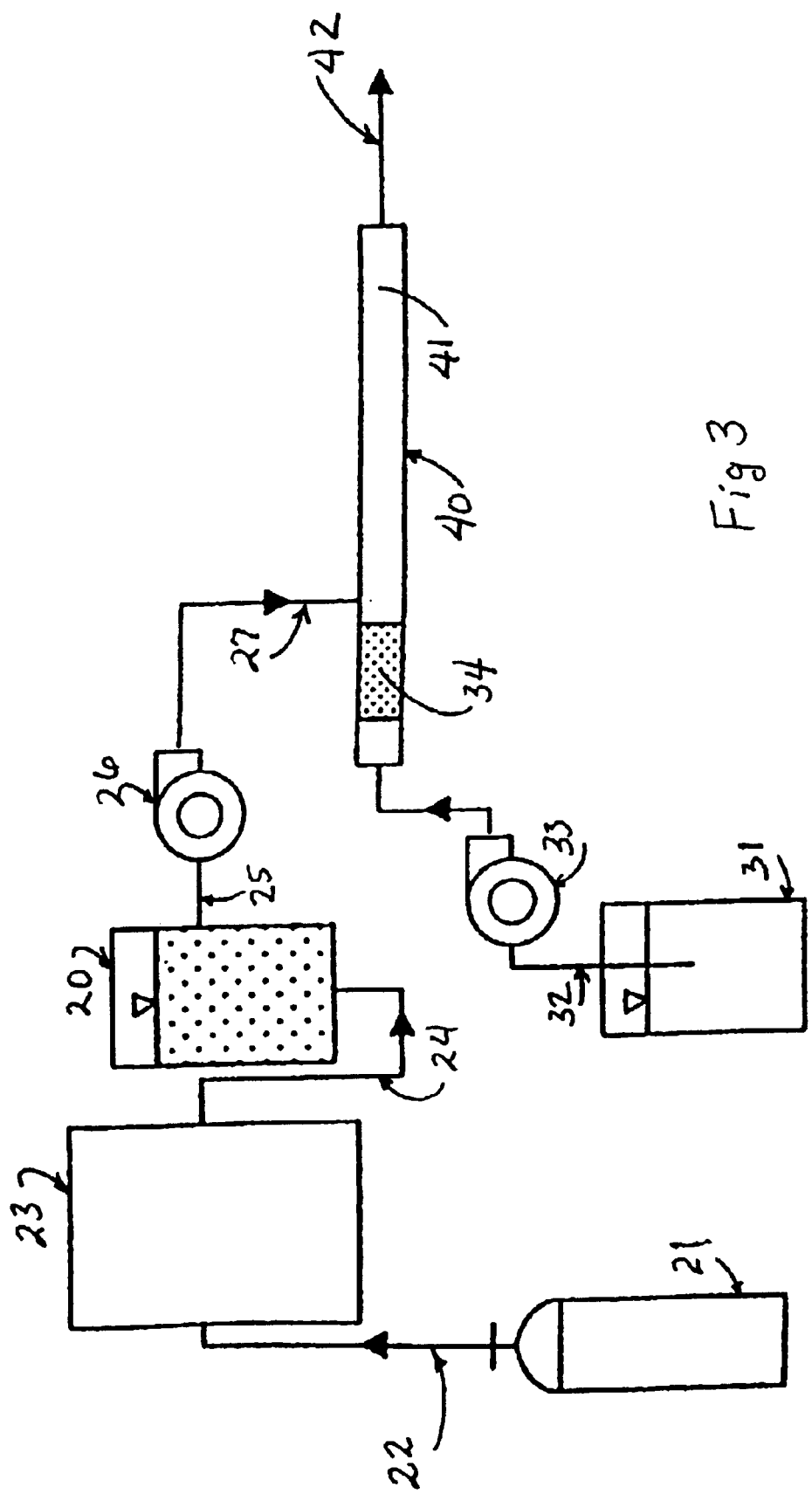
FIG. 3 is a depiction of the experimental apparatus used in another embodiment of the present invention.

In another preferred embodiment as depicted in FIG. 3, the process employs tubular reactor 40. The process depicted in FIG. 3 is substantially the same as that described for the process of FIG. 2, except that CSTR 10 and fixed bed reactor 30 are replaced with tubular reactor 40. Aqueous hydrogen peroxide and organic contaminant 32 contacts fixed sand bed 34 within tubular reactor 40. Aqueous ozone 27 contacts the aqueous effluent from fixed sand bed 34 in plug flow reactor section 41 of tubular reactor 40. Outlet stream 42 is withdrawn continuously for sampling.

Other variations of the processes depicted in FIGS. 2 and 3 are possible and can be conceived by one skilled in the art. The embodiments described are not meant to limit the invention thereto; the claims will define the scope of the invention.

In order to demonstrate the practice of the present invention, the following examples have been prepared and tested as described in the General Experimentation Section disclosed hereinbelow. The examples should not, however, be viewed as limiting the scope of the invention. The claims will serve to define the invention.

General Experimentation

EXAMPLE 1

Apparatus

The general experimental apparatus used in the following examples was similar to that shown in FIG. 2. With reference to FIG. 2., a tank 21 supplies oxygen to an ozone generator 23 wherein ozone is generated from the oxygen. The generated ozone contacts water in a mass transfer chamber 20 wherein the ozone is dissolved in the water. The ozone/water solution 25 is then pumped to a flask 10, which serves as a continuously stirred tank reactor, or CSTR.

An aqueous solution of hydrogen peroxide and a phenol is pumped from a reservoir 31 through a fixed bed column 30 containing sand 34. The flowrate of the aqueous solution and the sand volume serve to define the hydraulic residence time, or HRT of the fixed bed. Upon leaving the fixed bed the aqueous solution enters the CSTR 10.

The flowrates of the entering streams 27 and 35 and the CSTR volume serve to define the HRT of the CSTR. Initial concentrations of hydrogen peroxide and ozone in their entering streams were 25 mg/L and 1.5 mg/L, respectively. The pH was in the range of 6–7.

Exit stream 12 is continuously withdrawn and sampled for analysis.

EXAMPLE 2

Zero Volume Fixed Bed

Following the procedure of Example 1, the fixed bed column had no added sand giving HRT of zero for the fixed bed. A CSTR HRT of 20 minutes reduced the phenol concentration from 5 mg/L to 4.6 mg/L, as shown in Table 1.

EXAMPLE 3

Northern Gravel Co. Sand

Following the procedure of Example 1, the fixed bed column was filled with Northern Gravel Co., Muscatine, Iowa, sand to give a fixed bed HRT of 0.2 minutes. The CSTR HRT was 20 minutes. The phenol concentration was reduced from 5 mg/L to 4 mg/L as shown in Table 1.

EXAMPLE 4

West Liberty, Iowa Sand

Following the procedure of Example 1, the fixed bed column was filled with West Liberty, Iowa sand to five a fixed bed HRT of 0.2 minutes. The CSTR HRT was 20 minutes. The phenol concentration was reduced from 5 mg/L to 3.2 mg/L as shown in Table 1.

TABLE I

| Catalyst | Fixed Bed HRT (min) | CSTR HRT (min) | $[Phenol]_e$ (mg/L) | $[Phenol]_f$ (mg/L) | Removal % |
|---|---|---|---|---|---|
| None | 0.0 | 20 | 5.0 | 4.6 | 7.3 |
| Northern Gravel Co. | 0.2 | 20 | 5.0 | 4.0 | 19.2 |
| West Liberty, IA. | 0.2 | 20 | 5.0 | 3.2 | 35.2 |

Thus it should be evident that the device and methods of the present invention are highly effective in treating contaminated aqueous media. The invention is particularly suited for oxidative degradation of contaminants, but is not necessarily limited thereto. The device and method of the present invention can be used separately with other equipment, methods and the like.

Based upon the foregoing disclosure, it should now be apparent that the use of the process and apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, processes according to the present invention are not necessarily limited to those having a CSTR, PFR or tubular reactor. Moreover, as noted hereinabove, other means for ozone generation can be substituted for the ozone generator and mass transfer chamber. Thus, the scope of the invention shall include all modifications and variations that may fall within the scope of the attached claims.

What is claimed is:

1. A process for the treatment of an aqueous media having contaminants therein, comprising:
   adding hydrogen peroxide to the aqueous media;
   exposing the aqueous media to a catalytic environment;
   removing the aqueous media from the catalytic environment prior to the aqueous media having a five minute residence time within the catalytic environment;

adding ozone to the aqueous media immediately after removing the aqueous media from the catalytic environment; and allowing the ozone and aqueous media to interact for at least one minute outside of the presence of the catalytic environment.

2. A process for the treatment of an aqueous media, as set forth in claim 1, wherein said step of allowing the ozone and aqueous media to interact occurs for at least five minutes outside of the presence of the catalytic environment.

3. A process for the treatment of an aqueous media, as set forth in claim 1, wherein said step of removing occurs prior to the aqueous media having a one minute residence time with the catalytic environment.

4. A process for the treatment of an aqueous media, as set forth in claim 1, wherein said step of removing occurs prior to the aqueous media having a one-half minute residence time with the catalytic environment.

5. A process for the treatment of an aqueous media, as set forth in claim 4, wherein the aqueous media has a residence time within the catalytic environment of from about 0.05 to about 0.25 minute.

6. A process for the treatment of an aqueous media, as set forth in claim 1, further comprising the step of placing the aqueous media in a reaction tank after said step of removing from the catalytic environment, and then subsequently reintroducing the aqueous media to the catalytic environment.

7. A process for the treatment of an aqueous media, as set forth in claim 1, where hydrogen peroxide is added to the aqueous media in a range of from about 0.2 to about 0.5 mg hydrogen peroxide per milligram of ozone.

8. A process for the treatment of an aqueous media, as set forth in claim 7, where hydrogen peroxide is added to the aqueous media in a range of from about 0.3 to about 0.4 mg hydrogen peroxide per milligram of ozone.

9. A process for the treatment of an aqueous media, as set forth in claim 8, where hydrogen peroxide is added to the aqueous media in an amount of about 0.35 mg hydrogen peroxide per milligram of ozone.

10. A process for the treatment of an aqueous media, as set forth in claim 1, further comprising the step of adjusting the pH of the aqueous media in the range of about 4 to about 10.

11. A process for the treatment of an aqueous media, as set forth in claim 10, further comprising the step of adjusting the pH of the aqueous media in a range of about 6 to about 9.

12. A process for the treatment of an aqueous media having contaminants therein comprising the steps of:

adding hydrogen peroxide to the aqueous media;

exposing the aqueous media to a catalytic environment;

removing the aqueous media from the catalytic environment before five percent of the hydrogen peroxide decomposes;

adding ozone to the aqueous media immediately after removing the aqueous media from the catalytic environment; and allowing the ozone and aqueous media to interact for at least one minute outside of the presence of the catalytic environment.

13. A process for the treatment of an aqueous media, as set forth in claim 12, wherein said step of allowing the ozone and aqueous media to interact occurs for at least five minutes outside of the presence of the catalytic environment.

14. A process for the treatment of an aqueous media, as set forth in claim 12, wherein said step of removing the aqueous media from the catalytic environment occurs before one percent of the hydrogen peroxide decomposes.

15. A process for the treatment of an aqueous media, as set forth in claim 12, wherein said step of removing the aqueous media from the catalytic environment occurs before one percent of the hydrogen peroxide decomposes.

16. A process for the treatment of an aqueous media, as set forth in claim 12, further comprising the step of placing the aqueous media in a reaction tank after said step of removing from the catalytic environment, and then subsequently reintroducing the aqueous media to the catalytic environment.

17. An improved process for degrading organic contaminants within an aqueous media of the type where hydrogen peroxide is added to the aqueous media, and the aqueous media containing the hydrogen peroxide is introduced to a catalytic environment to initiate decomposition of the hydrogen peroxide, wherein the improvement comprises controlling the exposure of the hydrogen peroxide to the catalytic environment so that the aqueous media is removed from the catalytic environment before five percent of the hydrogen peroxide entering the catalytic environment is decomposed by the catalytic environment, adding ozone to the aqueous media immediately after removing the aqueous media from the catalytic environment, and allowing the ozone and aqueous media to interact for at least one minute outside of the presence of the catalytic environment.

18. A process for the treatment of an aqueous media, as set forth in claim 17, wherein said step of allowing the ozone and aqueous media to interact occurs for at least five minutes outside of the presence of the catalytic environment.

19. An improved process for degrading organic contaminants, as set forth in claim 17, wherein the aqueous media is removed from the catalytic environment before three percent of the hydrogen peroxide entering the catalytic environment is decomposed by the catalytic environment.

20. An improved process for degrading organic contaminants, as set forth in claim 17, wherein the aqueous media is removed from the catalytic environment before one percent of the hydrogen peroxide entering the catalytic environment is decomposed by the catalytic environment.

* * * * *